United States Patent [19]

Goto et al.

[11] Patent Number: 4,997,030
[45] Date of Patent: Mar. 5, 1991

[54] CENTRAL AIR CONDITIONING SYSTEM HAVING REMOTE CONTROLLER IN A PLURALITY OF ROOMS FOR STARTING OR STOPPING AIR CONDITIONING APPARATUS

[75] Inventors: Yukifumi Goto; Yoshihiro Chuma; Hidetoshi Narikiyo, all of Shizuoka, Japan

[73] Assignee: Kabushiki Kaisha Toshiba, Kanagawa, Japan

[21] Appl. No.: 446,127

[22] Filed: Dec. 5, 1989

[30] Foreign Application Priority Data

Jan. 24, 1989 [JP] Japan .................................. 1-14604
Jan. 24, 1989 [JP] Japan .................................. 1-14605

[51] Int. Cl.$^5$ .......................................... G05D 23/00
[52] U.S. Cl. ..................................... 165/22; 236/49.3; 236/51
[58] Field of Search ................. 236/51, 49.3; 165/22

[56] References Cited

U.S. PATENT DOCUMENTS

| | | | |
|---|---|---|---|
| 3,568,760 | 3/1971 | Hogel | 165/22 |
| 4,530,395 | 7/1985 | Parker et al. | 236/49.3 X |
| 4,635,445 | 1/1987 | Otsuka et al. | 165/22 X |
| 4,754,919 | 7/1988 | Otsuka et al. | 165/22 X |

FOREIGN PATENT DOCUMENTS

| | | |
|---|---|---|
| 60-47497 | 10/1985 | Japan . |
| 2183018A | 5/1987 | United Kingdom . |
| 2194651A | 3/1988 | United Kingdom . |
| 2215867A | 9/1989 | United Kingdom . |

Primary Examiner—William E. Wayner
Attorney, Agent, or Firm—Philip M. Shaw, Jr.

[57] ABSTRACT

A central air conditioning system includes an air conditioning apparatus having a system controller and a variable air volume controller having a damper which controls the amount of conditioned air fed from the air conditioning apparatus into each room to be air-conditioned. Each room is provided with a room remote controller for controlling the operation of the air volume controller. The room remote controller outputs a start/stop command signal to control the operation of both the air conditioning apparatus and the air volume controller. The temperature of conditioned air fed from the air conditioning apparatus is maintained at a prescribed value determined on the basis of the desired room temperature in each room.

8 Claims, 5 Drawing Sheets

CENTRAL AIR CONDITIONING SYSTEM HAVING REMOTE CONTROLLER IN A PLURALITY OF ROOMS FOR STARTING OR STOPPING AIR CONDITIONING APPARATUS

BACKGROUND OF THE INVENTION

1. Field of the Invention

This invention relates, in general, to air conditioning systems. In particular, the invention relates to a system in which conditioned air is supplied to a plurality of rooms from one air conditioning apparatus through a duct.

2. Description of the Related Art

In a conventional air conditioning system including one air conditioning apparatus and a common duct which communicates with a plurality of rooms to be air-conditioned, a plurality of paths are provided between the common duct and the plurality of rooms. An automatic air volume control device, i.e., a so-called VAV (variable air volume) device, usually is provided in each path. In such an automatic air control device (hereinafter referred to as a VAV device) includes a damper and an air volume sensor to control an amount of heated/cooled air flowing into the corresponding room through the damper. The opening degree of the damper is controlled on the basis of the air conditioning load of the corresponding room. The air conditioning load is a difference between a desired room temperature set through a room thermostat provided in each room and a detected room temperature.

In the above-described conventional air conditioning system including the VAV device, ON/OFF operations of both the air conditioning apparatus and the VAV device are executed independently. The air conditioning apparatus may operate while dampers of VAV devices are closed. The compressor and the fan device of the air conditioning apparatus operate at a prescribed low rotational speed respectively when the air conditioning apparatus operates. Thus, electric energy may be consumed uselessly until the VAV device operates. Furthermore, the temperature of the conditioned air fed from the air conditioning apparatus is previously set at a desirable value through the operation panel of the air conditioning apparatus irrespective of actual heat load in each room to be air-conditioned. Thus, insufficient air-conditioning to each room may occur when the desired room temperature set through the room thermostat in each room is excessively high or low, as compared with the actual room temperature, in other words, when the heat load in each room is excessively large.

SUMMARY OF THE INVENTION

Accordingly, it is an object of the present invention to control the operation of an air conditioning apparatus by a remote control unit in each room in a central air conditioning system.

It is another object of the invention to supply conditioned air sufficient to control the temperature of each room to be air-conditioned at each desired room temperature in a central air conditioning system.

To accomplish the above-described objects, according to one aspect of the present invention, a central air conditioning system wherein conditioned air is supplied to a plurality of rooms to be air-conditioned through a common duct includes an air conditioning apparatus for generating conditioned air and forcibly supplying the conditioned air to the common duct and a variable air volume control unit, corresponding to each room, for controlling the flow of the conditioned air from the common duct into the corresponding room. The central air conditioning sytem also includes a room remote controller, provided in each room, including a start/stop function wherein a start/stop command signal is output therefrom to control the operation of both the air conditioning apparatus and variable air volume control unit, a desired room temperature set function wherein a desired room temperature is set therethrough and a temperature detection function wherein the actual room temperature of the corresponding room is detected, and a system remote controller including an ON/OFF function wherein an ON/OFF command signal is output therefrom to control the operation of the air conditioning apparatus. The room remote controller may include a mode selection function wherein either the heating or cooling mode is selected.

According to another aspect of the present invention, a central air conditioning system wherein conditioned air is supplied to a plurality of rooms to be air-conditioned through a common duct includes an air conditioning apparatus, having a housing, for generating conditioned air and forcibly supplying the conditioned air to the common duct, and a variable air volume control unit, corresponding to each room, for controlling a flow of the conditioned air from the common duct into the corresponding room. The central air conditioning system also includes a room remote controller, provided in each room, including a start/stop function wherein a start/stop command signal is output therefrom to control the operation of both the air conditioning apparatus and variable air volume control unit, a desired room temperature set function wherein a desired room temperature is set therethrough and a temperature detection function wherein the actual room temperature of the corresponding room is detected, and a system controller, attached to the housing of the air conditioning apparatus, including an ON/OFF function wherein an ON/OFF command signal is output therefrom to control the operation of the air conditioning apparatus. The room remote controller may include a mode selection function wherein either a heating or a cooling mode is selected. The system controller may include a priority mode operation function wherein the air conditioning apparatus is operated in either the cooling or heating mode in accordance with a predetermined priority when both the heating and cooling modes are selected by different room remote controllers. The system controller may also include a target temperature determination function wherein a target temperature of the conditioned air from the air conditioning apparatus is determined based on the desired room temperature in each room to be air conditioned.

BRIEF DESCRIPTION OF THE DRAWINGS

These and other objects and advantages of this invention will become more apparent and more readily appreciated from the following detailed description of the presently preferred exemplary embodiment of the invention taken in conjunction with the accompanying drawings, wherein like reference numerals throughout the various figures denote like structure elements and wherein.

DETAILED DESCRIPTION OF THE PREFERRED EMBODIMENTS

Preferred embodiments of the present invention will be described in more detail with reference to the accompanying drawings.

Figure 1:
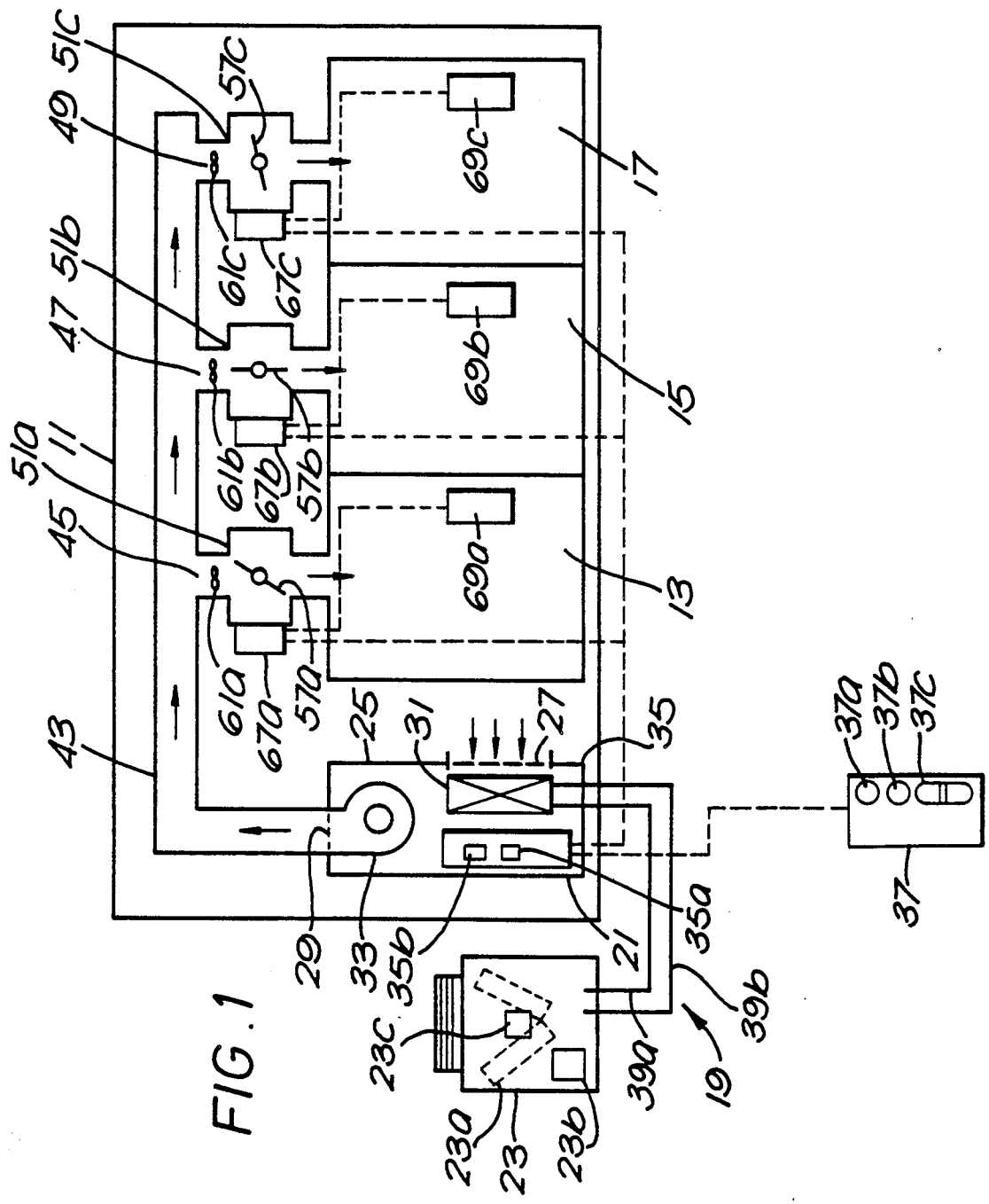
FIG. 1 is a schematic view illustrating a central air conditioning a system of a first embodiment of the present invention.

As shown in FIG. 1, a building 11 includes first, second and third room spaces 13, 15 and 17 to be air conditioned. A heat pump type air conditioning apparatus 19 includes an internal unit 21 disposed in building 11 and an external unit 23. Internal unit 21 includes a casing 25 wherein an intake opening 27 is formed in the side wall thereof and a discharge opening 29 is formed in the upper wall thereof. An internal heat exchanger 31 is arranged at the inside of the casing opposite to intake opening 27. A variable capacity internal fan device 33 is attached to the upper wall of the casing to communicate with discharge opening 29. A control section 35 is provided to internal unit 21. Control section 35 includes a system controller 35a, a fan speed control inverter 35b, etc. Control section 35 also includes a system remote controller 37 wherein a plurality of operation keys 37a, 37b are provided. For example, operation key 37a is an ON/OFF key, and operation key 37b is a cool/heat operation selection key. System remote controller 37 also includes a slide knob 37c to set the temperature of the conditioned air fed from fan device 33 (air conditioning apparatus 19).

External unit 23 includes an external heat exchanger 23a, a variable capacity compressor 23b, and a compressor speed control inverter 23c. External heat exchanger 23a and compressor 23b in external unit 23 are in communication with internal heat exchanger 31 in internal unit 21 through a pair of refrigerant pipes 39a, 39b to perform a refrigerating cycle.

As shown in FIG. 1, one of the ends of an elongated main duct 43 is in communication with discharge opening 29 of internal unit 21, and the other end thereof is closed. A plurality of openings 45, 47 and 49 are formed in the portions of main duct 43 corresponding to first, second and third room spaces 13, 15 and 17. A plurality of VAV devices 51a, 51b and 51c are provided between the openings 45, 47 and 49 of main duct 43 and the first, second and third room spaces 13, 15 and 17 to supply conditioned air from internal fan device 33 to each room 13, 15, 17. Since the construction of each VAV device 51a, 51b, 51c is similar to one another, the construction of one of the VAV devices 51a will be described.

Figure 2:
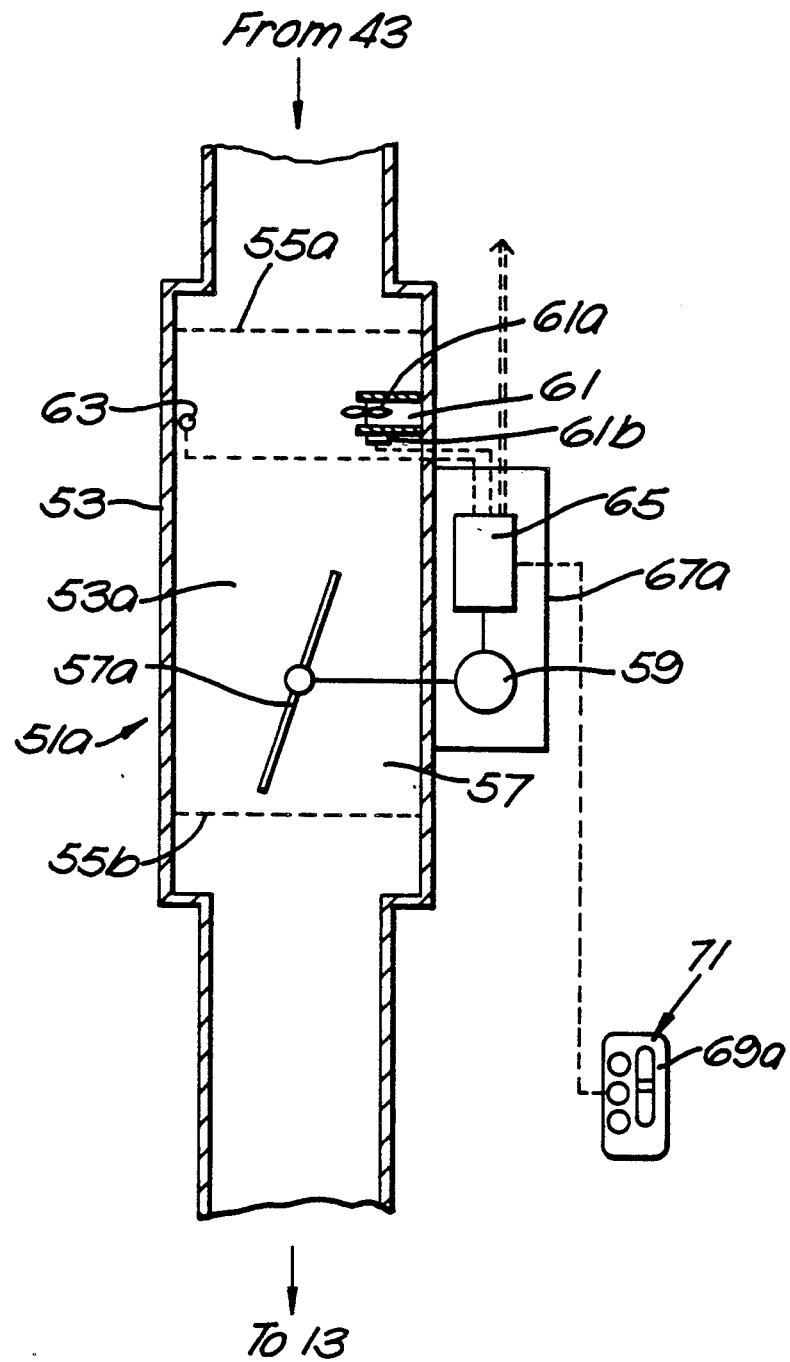
FIG. 2 is an enlarged view illustrating a variable air volume device shown in FIG. 1.

As shown in FIG. 2, VAV device 51a includes a duct 53 for defining an air pass 53a therein. One of the ends of duct 53 is in communication with opening 45 of main duct 43, and the other end thereof is in communication with room space 13 to channel the conditioned air to room 13. A pair of air permeable screens 55a, 55b is disposed across air passage 53a in duct 53. One of the pair of screens 55a is disposed at the main duct side and the other screen 55b is disposed at the room side to define an operational space 57 therebetween. A damper 57a is rotatably disposed across air passage 53a in duct 53 to control the flow of the conditioned air fed from main duct 43 to room 13. Damper 57a is rotated by a motor 59 disposed outside duct 53 to regulate the opening degree of damper 57a. A wind velocity sensor 61 is arranged between damper 57a and screen 55a in duct 53. Wind velocity sensor 61 includes a propeller 61a rotating in response to the flow speed of conditioned air in duct 53, and a rotational speed detection element 61b for detecting the rotational speed of propeller 61a to measure the amount of the conditioned air flowing through damper 57a. A temperature sensor 63 is also disposed between damper 57a and screen 55a to detect the temperature of the conditioned air flowing through duct 53. Detection signals from wind velocity sensor 61 and temperature sensor 63 are input to a control circuit 65 arranged in a control box 67a attached to the outer wall of duct 53. Motor 59 is also disposed in control box 67a.

As shown in FIG. 1, a room remote controller 69a, 69b, 69c is provided in each room 13, 15, 17. Control command signals output from room remote controller 69a are supplied to control circuit 65. Room remote controller 69a includes an ON/OFF function wherein the operations of air conditioning apparatus 19 and the corresponding VAV device 51a are started or stopped simultaneously, a temperature set function wherein a desired room temperature is set to control circuit 65, and a temperature detection function wherein an actual room temperature is detected. Room remote controller 69a may include a mode set function wherein either a cooling or a heating mode is selected. A plurality of operation keys 71 corresponding to the above-described functions are provided to room remote controller 69a to input each control command signal to control section 35 of internal unit 21 through control circuit 65.

Figure 3:
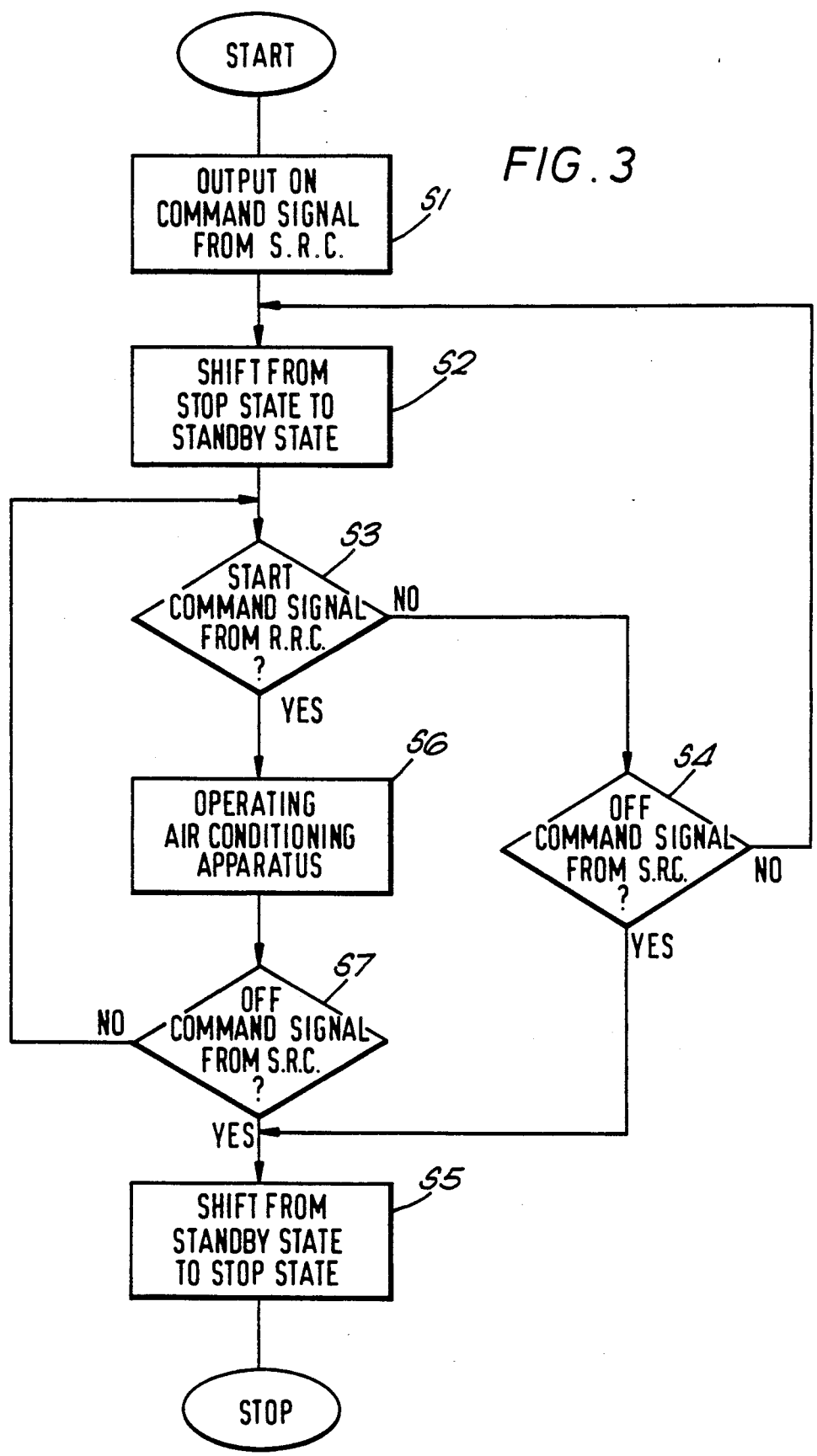
FIG. 3 is a flow chart of the operation of the central air conditioning system of FIG. 1.

The operation of the above-described air conditioning system will be described with reference to FIG. 3. When an ON command signal is output from system remote controller (S. R. C) 37 (step S1), air conditioning apparatus 19 shifts from a stop state to a standby state in step S2. In the standby state, the electric circuitry of this system is energized. However, fan device 33 and compressor 23b of air conditioning apparatus 19 are not operated. At this time, an operation mode and the temperature of the conditioned air fed from air conditioning apparatus 19 are set through system remote controller 37. In step S3, if a start command signal is output from at least one room remote controller (R.R.C.), e.g., 69a, the YES-path is taken. Otherwise, the NO-path is taken.

In step S4, if an OFF command signal is output from system remote controller 37, the YES-path is taken. The air conditioning apparatus 19 shifts from the standby state to the stop state (step S5). When the NO-path is taken in step S4, air conditioning apparatus 19 maintains the standby state (step S2). When the YES-path is taken in step S3, air conditioning apparatus 19 further shifts from the standby state to an operation state (step S6). Air conditioning apparatus 19 is operated at a set mode, e.g., cooling mode, to maintain the temperature of the conditioned air fed from air conditioning apparatus 19 at the set value. External unit 23, i.e., compressor 23b is energized, and internal fan device 33 is driven by fan speed control inverter 35b through system controller 35a. A refrigerating cycle is performed, and thus, internal heat exchanger 31 acts as an evaporator in cooling mode or as a condenser in heating mode. Upon the operation of internal fan device 33, air is taken into casing 25 of internal unit 21 through intake opening 27 to exchange heat between internal heat exchanger 31 and the intaken air and then discharged as conditioned air into main duct 43 through discharge opening 29. The conditioned air flows along main duct 43, and is supplied to each room 13, 15, 17 through the corresponding VAV devices 51a, 51b and 51c (if all of VAV devices are operated).

During the above-described operation, heat load, i.e., difference between the actual room temperature and the desired room temperature, of each room is detected by the respective control circuit 65 through a temperature sensor (not shown) provided in the corresponding room remote controllers 69a, 69b, 69c. The output frequency of fan speed control inverter 35b is controlled in response to the total amount of each heat load to regulate the amount of the conditioned air fed from internal unit 21 to main duct 43 at a suitable level.

Furthermore, the opening degree of each damper 57a, 57b, 57c of VAV device 51a, 51b, 51c is controlled by each control circuit 65 in response to each heat load in the corresponding rooms 13, 15 and 17. At this time, the detection results of both wind velocity sensor 61 and temperature sensor 53a are input into each VAV device 51a, 51b, 51c to control each damper 57a, 57b, 57c properly. In the cooling mode, if the actual room temperature in one of the rooms e.g., 13, is greater than the desired room temperature, the opening degree of damper 57a of the corresponding VAV device 51a is controlled toward a fully opened position to increase the amount of the conditioned air fed to room 13. On the other hand, if the actual room temperature in room 13 is smaller than the desired room temperature, the opening degree of damper 57a is controlled toward a closed position to decrease the amount of the conditioned air fed to room 13. Furthermore, if the damper of at least one VAV device, e.g., 51a is at the fully opened position and the amount of the conditioned air fed to the corresponding room 13 is insufficient, control circuit 65 outputs a command signal to system controller 35a to increase the output frequency of fan speed control inverter 35b. Thus, the rotational speed of fan device 33 increases to supply a sufficient amount of the conditioned air to room 13. If the damper of each VAV device 51a, 51b, 51c is at a position between the fully opened position and the closed position and the amount of the conditioned air fed to each room is sufficient, each control circuit 65 outputs a command signal to system controller 35a to decrease the output frequency of fan speed control inverter 35b. The rotational speed of fan device 33 decreases to supply a proper amount of the conditioned air to each room in view of energy saving. During the operation, the rotational speed of fan device 33 is controlled in response to the heat load in each room 13, 15, 17. In step S7, if the OFF command signal is output from system remote controller 37, the YES-path is taken and the above-described step S5 is executed. Thus, air conditioning apparatus 19 stops. Otherwise, the NO-path is taken, and the above-described step S3 is re-executed. At this time, if the start command signal output from each room remote controller 69a, 69b, 69c is stopped, air conditioning apparatus 19 shifts from the operation state to the standby state (step S2).

In the above-described operation of the one embodiment, when air conditioning apparatus 19 is stopped in response to the OFF command signal output from system remote controller 37 during the operation, air conditioning apparatus 19 maintains the stop state even if the start command signal is output from room remote controller 69a, 69b, 69c.

With above-described embodiment, since fan device 33 of air conditioning apparatus 19 stops before all of the dampers 57a, 57b and 57c are closed when the start command signal output from each room remote controller 69a, 69b, 69c is stopped, static pressure is not applied in excess to main duct 43, and an audible air leakage noise is not issued from each damper 57a, 57b, 57c.

Figure 4:
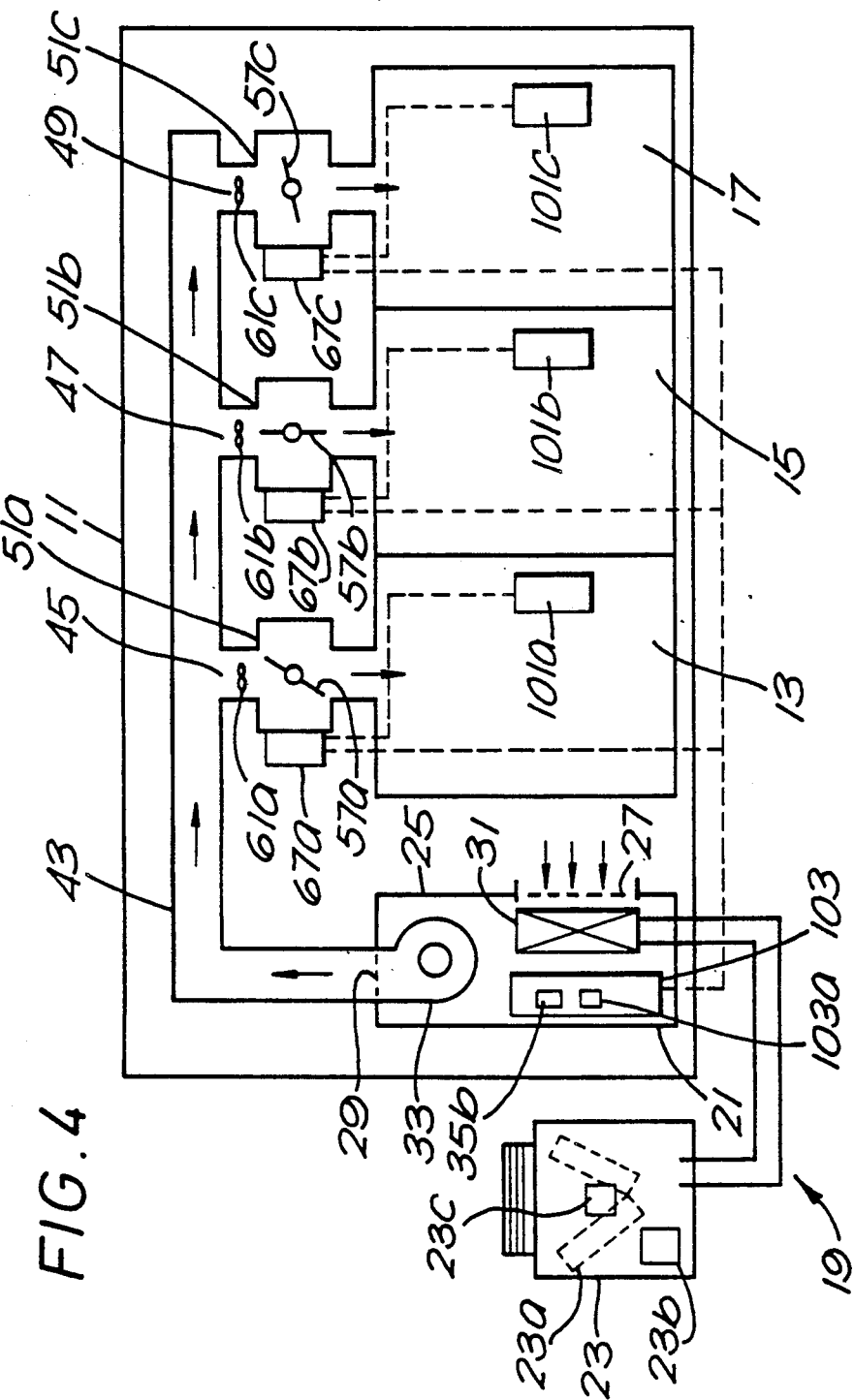
FIG. 4 is a schematic view illustrating a central air conditioning system of a second embodiment of the invention.
Figure 5:
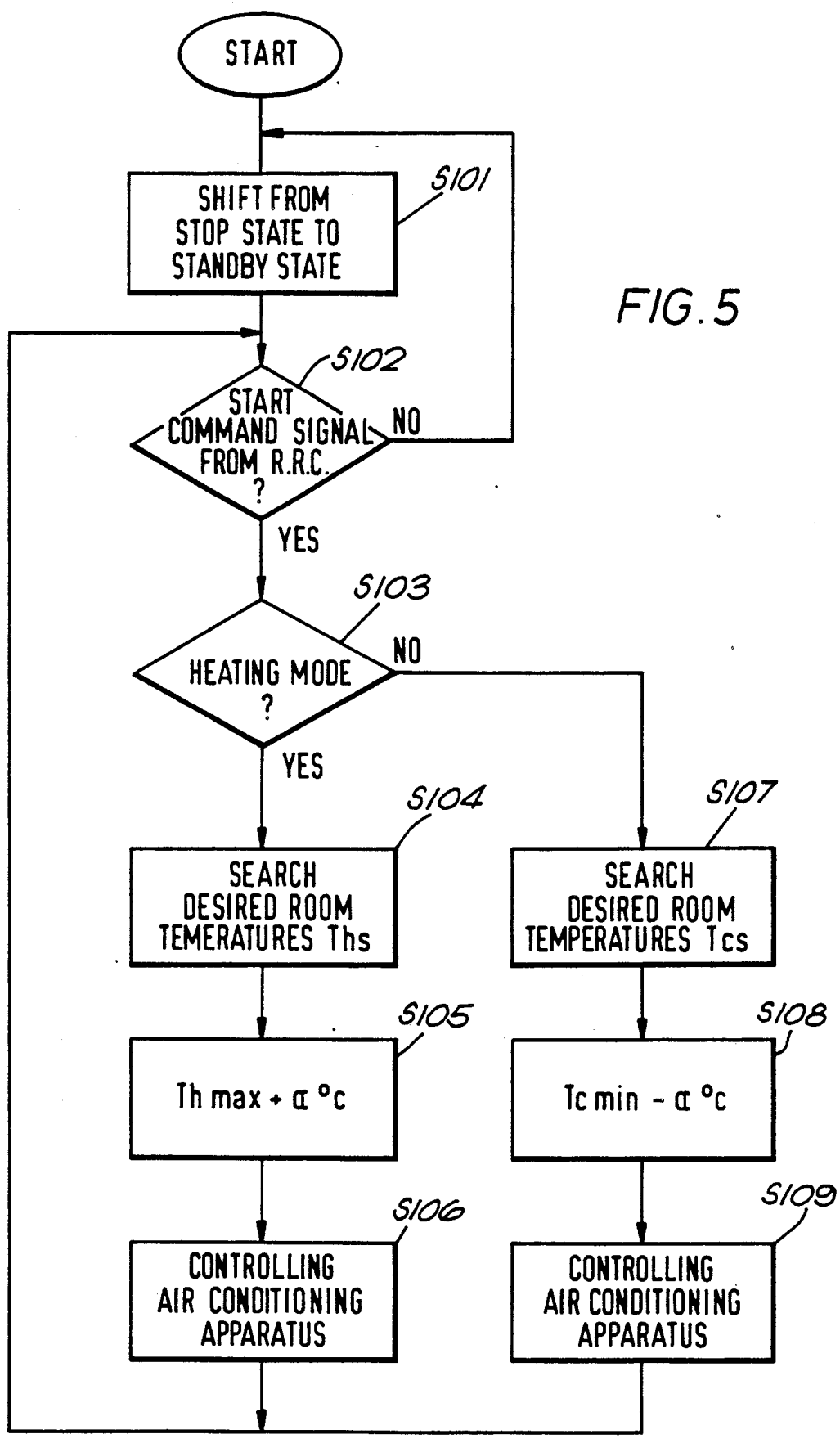
FIG. 5 is a flow chart illustrating the operation of the air conditioning system of FIG. 4.

A second embodiment of the present invention will now be described with reference to FIGS. 4 and 5. However, since the construction of the air conditioning system of this embodiment is similar to that of the first embodiment, the same numerals are applied to similar elements, and therefore, detailed descriptions thereof are not repeated.

In this embodiment, room remote controller 101a, 101b, 101c in each room 13, 15, 17 includes a start/stop function wherein the operation of both the air conditioning apparatus and the corresponding VAV device are started or stopped simultaneously, a temperature set function wherein a desired room temperature is set to the corresponding control circuit, and a temperature detection function wherein an actual room temperature is detected. Each room remote controller 101a, 101b, 101c also includes a mode set function wherein either a cooling or a heating mode is selected. A control section 103 includes a system controller 103a. System controller 103a includes a temperature of conditioned air control function wherein the temperature of the conditioned air fed from air conditioning apparatus 19 is regulated at a target temperature Tfs by controlling the capacity of compressor 23b through compressor speed control inverter 23c. System controller 103a also includes an air volume control function wherein the amount of conditioned air fed from fan device 33 (air conditioning apparatus 19) is regulated by controlling the rotational speed of fan device 33 through fan speed control inverter 35b. In particular, in this embodiment, system controller 103a includes a priority mode operation function wherein air conditioning apparatus 19 operates in a predetermined priority mode, e.g., heating mode, when both heating and cooling modes are commanded from different room remote controllers 69a, 69b and 69c. Such different modes may be commanded simultaneously in a middle season, e.g., spring or autumn. System controller 103a may include an ON/OFF function wherein the operation of air conditioning apparatus 19 is started or stopped. In this embodiment, the central air conditioning system carries out a temperature set operation in an initial stage of air conditioning to set a target temperature of the conditioned air fed from fan device 33.

The operation of the above-described second embodiment will be described with reference to FIG. 5.

Air conditioning apparatus 19 shifts from the stop state to the standby state when an electric power is applied thereto (step S101). In step S102, if a start command signal is fed from at least one room remote controller, e.g., 101a, the YES-path is taken. Otherwise, the NO-path is taken. When the YES-path is taken in step S102, an operation mode is determined in step S103. If a heating mode is commanded from room remote controller 101a, the YES-path is taken. Otherwise, the NO-path is taken. As stated before, if a cooling mode is requested from another room remote controller, e.g., 101b, while a heating mode has been set in the system controller 103a, the request for cooling mode is not effectuated and the heating mode is maintained. When the YES-path is taken in step S103, a desired room temperature Ths in each room 13, 15, 17 set through the corresponding room remote controllers 101a, 101b, 101c is searched by system controller 103a to determine a maximum value Thmax of desired room temperature Ths (step S104). A value of target temperature Tfs of conditioned air is determined by adding a prescribed value $\alpha$ to the maximum value Thmax of desired room temperature Ths (step S105). A heating operation is executed. Compressor 23b of air conditioning apparatus 19 is controlled by system controller 103a through compressor speed control inverter 23c to maintain the temperature of conditioned air fed from air conditioning apparatus 19 at the determined value, i.e., Thmax+$\alpha$ °C., of target temperature Tfs (step S106). If the NO-path is taken in step S103, a desired room temperature Tcs in each room 13, 15, 17 is searched by system controller 103a to determine a minimum value Tcmin of desired room temperature Tcs (step S107). In step S108, a value of target temperature Tfs of conditioned air is determined by subtracting a prescribed value $\alpha$ from the minimum value Tcmin of desired room temperature Tcs. Then a cooling operation is carried out. Compressor 23b of air conditioning apparatus 19 is controlled by system controller 103a to maintain the temperature of conditioned air fed from air conditioning apparatus 19 at the determined value, e.g., Tcmin+$\alpha$ °C., of target temperature Tfs (step S109).

The above-described steps are repeatedly executed until a stop command signal is outputed from each room remote controller 101a, 101b, 101c. When a stop command signal is outputed from all activated room remote controllers, air conditioning apparatus 19 shifts from the operation state to the standby state.

The air conditioning operation and the control of each VAV device in the second embodiment are similar to that in the first embodiment. Thus, descriptions of such operations are not repeated.

According to the above-described second embodiment, since air conditioning apparatus 19 immediately stops when the stop command signal is output from all activated VAV devices, extra power consumption of air conditioning apparatus 19 may be avoided. Since fan device 33 of air conditioning apparatus 19 stops before all activated dampers are closed, the static pressure in main duct 43 does not increase in excess and an audible air leakage noise from each damper is avoided.

In particular, with the above-described embodiment, since the target temperature Tfs of conditioned air fed from air conditioning apparatus 19 is determined based on the desired room temperature Tcs, Ths of each room, an optimum target temperature Tfs of conditioned air, corresponding to the total heat load of each room, fed from air conditioning apparatus 19 can be obtained. Insufficient air-conditioning to each room may be avoided.

The present invention has been described with reference to specific embodiments. However, other embodiments based on the principles of the present invention should occur to those of ordinary skill in the art. Such embodiments are intended to be covered by the claims.

What is claimed is:

1. A central air conditioning system wherein conditioned air is supplied to a plurality of rooms to be air-conditioned through a common duct, the system comprising:
   air conditioning means for generating conditioned air and forcibly supplying the conditioned air to the common duct;
   variable air volume control means, corresponding to each room, for controlling a flow of the conditioned air from the common duct into corresponding room;
   a room remote controller, provided in each room, including a start/stop function wherein a start/stop command signal is output therefrom to control the operation of both the air conditioning means and variable air volume control means, a desired room temperature set function wherein a desired room temperature is set therethrough, a temperature detection function wherein the actual room temperature of the corresponding room is detected, and a mode selection function wherein one of the heating and cooling modes is selected; and
   a system remote controller including an ON/OFF function wherein an ON/OFF command signal is output therefrom to control the operation of the air conditioning means.

2. A system according to claim 1, wherein the system remote controller includes a mode selection function wherein one of the heating and cooling modes is selected.

3. A system according to claim 2, wherein the system remote controller also includes a target temperature set function wherein a target temperature of the conditioned air from the air conditioning means is set therethrough.

4. A central air conditioning system wherein conditioned air is supplied to a plurality of rooms to be air-conditioned through a common duct, the system comprising:
   air conditioning means, having a housing, for generating conditioned air and forcibly supplying the conditioned air to the common duct;
   variable air volume control means, corresponding to each room, for controlling a flow of the conditioned air from the common duct into corresponding room;
   a room remote controller, provided in each room, including a start/stop function wherein start/stop command signal is output therefrom to control the operation of both the air conditioning means and variable air volume control means, a desired room temperature set function wherein a desired room temperature is set therethrough, a temperature detection function wherein the actual room temperature of the corresponding room is detected, and a mode selection function wherein one of the heating and cooling modes is selected; and
   a system controller attached to the housing of the air conditioning means, including an ON/OFF function wherein an ON/OFF command signal is output therefrom to control the operation of the air conditioning means.

5. A system according to claim 4, wherein the system controller includes a priority mode operation function wherein the air conditioning means is operated in one of the cooling and heating modes in accordance with a predetermined priority when both heating and cooling modes are selected by different room remote controllers.

6. A system according to claim 4, wherein the system controller includes a mode selection function wherein one of the heating and cooling modes is selected.

7. A system according to claim 6, wherein the system controller also includes a target temperature set function wherein a target temperature of the conditioned air from the air conditioning means is set therethrough.

8. A system according to claim 4, wherein the system controller includes a target temperature determination function wherein a target temperature of the conditioned air from the air conditioning means is determined based on the desired room temperature in each room to be air conditioned.

* * * * *